(12) United States Patent
Hattori

(10) Patent No.: US 8,614,729 B2
(45) Date of Patent: Dec. 24, 2013

(54) IMAGE FORMING APPARATUS AND METHOD FOR ADJUSTING ROTATIONAL PHASE DIFFERENCE OF ROTATING POLYGON MIRROR

(75) Inventor: Shota Hattori, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/555,274

(22) Filed: Jul. 23, 2012

(65) Prior Publication Data

US 2013/0027499 A1 Jan. 31, 2013

(30) Foreign Application Priority Data

Jul. 28, 2011 (JP) .................. 2011-165701

(51) Int. Cl.
*B41J 15/14* (2006.01)
*B41J 27/00* (2006.01)

(52) U.S. Cl.
USPC ........................... 347/243; 347/229; 347/261

(58) Field of Classification Search
USPC ......... 347/229, 231, 234–237, 243, 246–250, 347/259–261; 359/201.1, 201.2
See application file for complete search history.

(56) References Cited

U.S. PATENT DOCUMENTS

| | | | |
|---|---|---|---|
| 5,115,328 A | 5/1992 | Kadono | |
| 6,052,143 A | 4/2000 | Yoshino et al. | |
| 6,160,566 A * | 12/2000 | Maeda | 347/234 |
| 6,285,383 B1 * | 9/2001 | Klement et al. | 347/116 |
| 6,493,011 B1 * | 12/2002 | Shioya | 347/116 |
| 7,499,072 B2 * | 3/2009 | Izumiya et al. | 347/249 |
| 8,026,940 B2 * | 9/2011 | Kitao et al. | 347/261 |
| 2007/0091165 A1 | 4/2007 | Shukuya | |

FOREIGN PATENT DOCUMENTS

| | | |
|---|---|---|
| JP | 2018516 | 1/1990 |
| JP | 8-94950 | 4/1996 |
| JP | 9-233281 | 9/1997 |
| JP | 2000-43313 | 2/2000 |

\* cited by examiner

*Primary Examiner* — Hai C Pham
(74) *Attorney, Agent, or Firm* — Gerald E. Hespos; Michael J. Porco; Matthew T. Hespos

(57) ABSTRACT

An image forming apparatus includes a correction control unit and a correction amount adjusting unit. The correction control unit performs a phase correction process of changing a drive frequency of a driver for driving and rotating a rotating polygon mirror having a rotational phase difference judged not to coincide by a predetermined correction amount and driving the driver for a period corresponding to a specified clock number by a drive clock signal of the changed drive frequency if a rotational phase difference of another rotating polygon mirror does not coincide with a reference rotational phase difference. The correction amount adjusting unit reduces the predetermined correction amount by a predetermined specified amount and causes the correction control unit to perform the phase correction process again if the rotational phase difference does not coincide with a reference rotational phase difference after the phase correction process is performed.

5 Claims, 7 Drawing Sheets

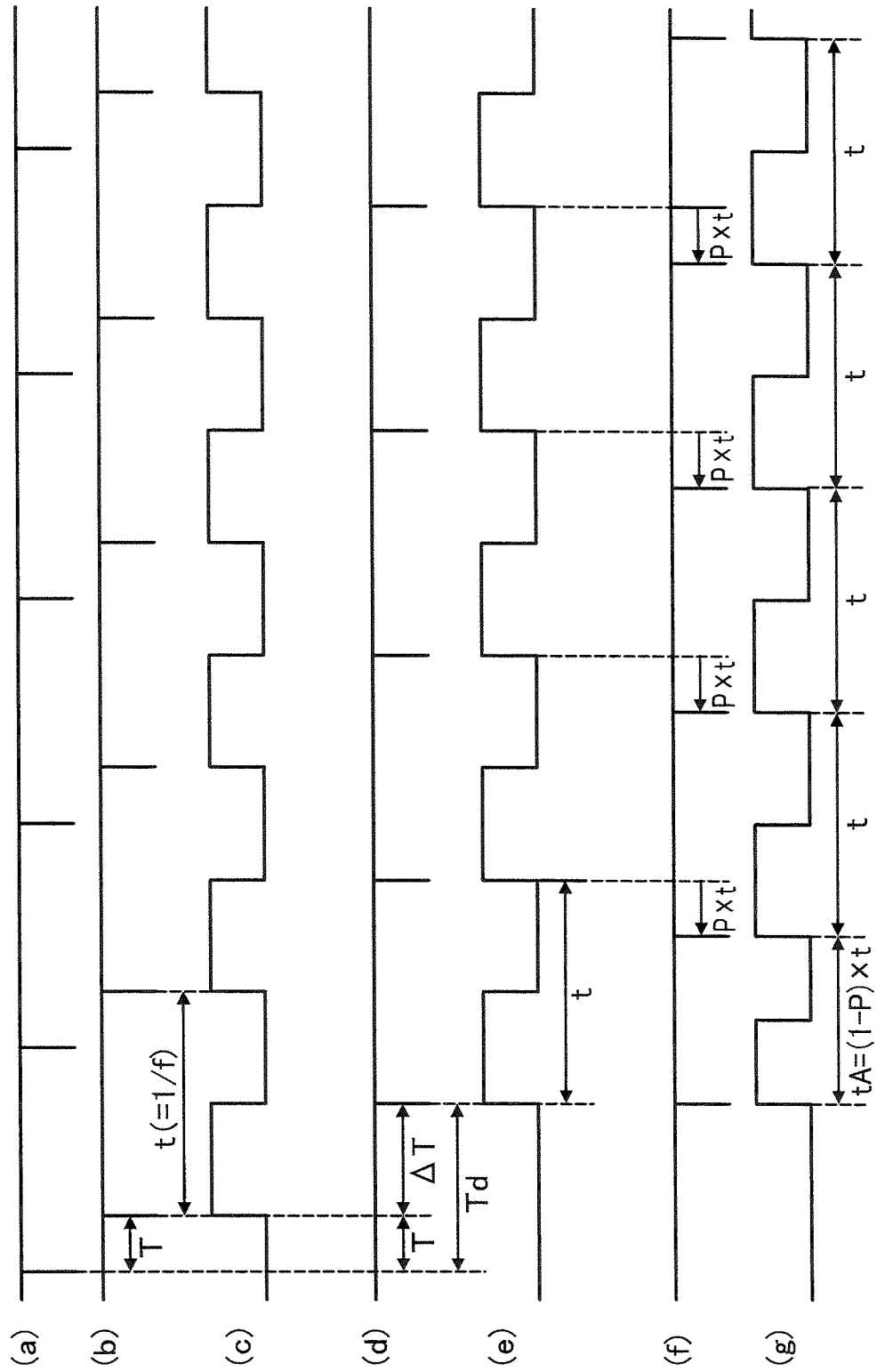

IMAGE FORMING APPARATUS AND METHOD FOR ADJUSTING ROTATIONAL PHASE DIFFERENCE OF ROTATING POLYGON MIRROR

INCORPORATION BY REFERENCE

This application is based on Japanese Patent Application Serial No. 2011-165701 filed with the Japan Patent Office on Jul. 28, 2011, the contents of which are hereby incorporated by reference.

BACKGROUND

The present disclosure relates to an image forming apparatus with a plurality of image forming units each including a rotating polygon mirror.

Conventionally, there has been known a so-called tandem image forming apparatus in which an image forming unit for forming a toner image on a surface of a photoconductive drum is provided for each of a plurality of colors and toner images of the respective colors are transferred in a superimposition manner onto a recording sheet or an intermediate transfer belt. In the image forming apparatus of this type, each image forming unit exposes the surface of the photoconductive drum to light to form an electrostatic latent image on the photoconductive drum surface by reflecting a laser beam emitted from a light source by each of reflecting surfaces of a rotating polygon mirror which is driven and rotated.

The toner images of the respective colors formed on the photoconductive drums by the respective image forming units need to be so transferred in a superimposition manner as not to cause any position gap on the recording sheet or the intermediate transfer belt. For this purpose, there is known a technology for controlling the operation of the rotating polygon mirrors in the image forming units other than a specified image forming unit so that the rotating polygon mirror in the specified image forming unit and the rotating polygon mirrors in the other image forming units rotate with specified phase differences to adjust write positions of electrostatic latent images formed on the surfaces of the photoconductive drums.

A known conventional image forming apparatus includes a reference clock generator, a phase difference measurement circuit for measuring temporal shift amounts of a plurality of beam detection signals generated by receiving laser beams deflected by the plurality of rotating polygon mirrors by counting reference clocks, a plurality of registers for storing a plurality of measured count values, a pulse generation circuit for generating one-shot pulses equivalent to periods corresponding to the stored count values, a frequency division circuit for outputting frequency division signals obtained by frequency-dividing the reference clock at predetermined ratios as motor clocks of the rotating polygon mirrors, and a controller for controlling the entire apparatus. The controller causes the one-shot pulses to be input from the pulse generation circuit to the frequency division circuit, temporarily stops the operation of the frequency division circuit during an effective period of the one-shot pulses, and independently controls the phases of the motor clocks with the accuracy of the reference clocks.

When a phase difference between the rotating polygon mirror in the specified image forming unit and that in the other image forming unit is larger than a predetermined phase difference, it is thought to make such an adjustment that the phase difference becomes the predetermined phase difference using one-shot pulses by applying the technology of the above conventional image forming apparatus. However, if the operation of the frequency division circuit is stopped for a long period corresponding to this large difference, the phase difference may vary during this period, which may cause a failure in adjusting the phase difference.

An object of the present disclosure is to provide an image forming apparatus and a method for adjusting a rotational phase difference of a rotating polygon mirror, the apparatus and the method being capable of making a satisfactory adjustment to bring the rotational phase difference of the rotating polygon mirror into coincidence with a reference rotational phase difference.

SUMMARY

An image forming apparatus according to one aspect of the present disclosure includes a plurality of image forming units for forming a toner image, a phase difference detection unit, a correction control unit and a correction amount adjusting unit.

Each image forming unit includes a photoconductive member having a surface for bearing a toner image, a light source for emitting a laser beam, a rotating polygon mirror having a plurality of reflecting surfaces for reflecting the laser beam toward the photoconductive member and adapted to scan the laser beam across the surface of the photoconductive member in a main scanning direction using the rotating reflecting surfaces by rotating, a driver for driving and rotating the rotating polygon mirror using a drive clock signal of a predetermined drive frequency, and an optical sensor for receiving the laser beam scanned by the rotating polygon mirror at a predetermined position and outputting a signal.

The phase difference detection unit detects a rotational phase difference of another rotating polygon mirror with respect to a rotational phase of the rotating polygon mirror set as a reference out of the rotating polygon mirrors provided in the respective image forming units using signals output by the optical sensors.

The correction control unit performs a phase correction process of changing a drive frequency of the driver for driving and rotating the rotating polygon mirror having a rotational phase difference judged not to coincide by a predetermined correction amount and driving the driver for a period corresponding to a specified clock number by a drive clock signal of the changed drive frequency if the rotational phase difference detected by the phase difference detection unit does not coincide with a reference rotational phase difference.

The correction amount adjusting unit reduces the predetermined correction amount by a predetermined specified amount and causes the correction control unit to perform the phase correction process again if the rotational phase difference detected by the phase difference detection unit after the phase correction process is performed by the correction control unit does not coincide with the reference rotational phase difference.

A method for adjusting a rotational phase difference of a rotating polygon mirror according to another aspect of the present disclosure is a method for adjusting a rotational phase difference of a second rotating polygon mirror with respect to a first rotating polygon mirror by a computer, and the following series of processes are performed by the computer. The series of processes include:

a process of driving and rotating the first rotating polygon mirror and the second rotating polygon mirror using a drive clock signal of a predetermined drive frequency and calculating a rotational phase difference of the both using information on a rotating state of the first rotating polygon mirror and that of the second rotating polygon mirror, a process of comparing the rotational phase difference and a predetermined reference rotational phase difference and judging whether or not the rotational phase difference is proper, a first phase correction process of temporarily changing a drive frequency of the second rotating polygon mirror from a reference drive frequency to a first corrected drive frequency corrected by a first correction amount and driving the second rotating polygon mirror when the rotational phase difference is judged not to be proper, and then resetting the drive frequency from the first corrected drive frequency to the reference drive frequency, a process of calculating the rotational phase difference of the both again using information on the rotating state of the first rotating polygon mirror and that of the second rotating polygon mirror after the first phase correction process, a process of comparing the rotational phase difference calculated again and the reference rotational phase difference and judging whether or not the rotational phase difference is proper, and a second phase correction process of setting a second corrected drive frequency obtained by correcting the drive frequency by a second correction amount smaller than the first correction amount, temporarily changing the drive frequency of the second rotating polygon mirror from the reference drive frequency to the second corrected drive frequency and driving the second rotating polygon mirror, and then resetting the drive frequency from the second corrected drive frequency to the reference drive frequency if the rotational phase difference is judged not to be proper.

These and other objects, features and advantages of the present disclosure will become more apparent upon reading the following detailed description along with the accompanying drawings.

BRIEF DESCRIPTION OF THE DRAWINGS

FIG. 7 is a timing chart showing an example of BD signals, drive clock signals and corrected signals of these.

DETAILED DESCRIPTION

Figure 1:
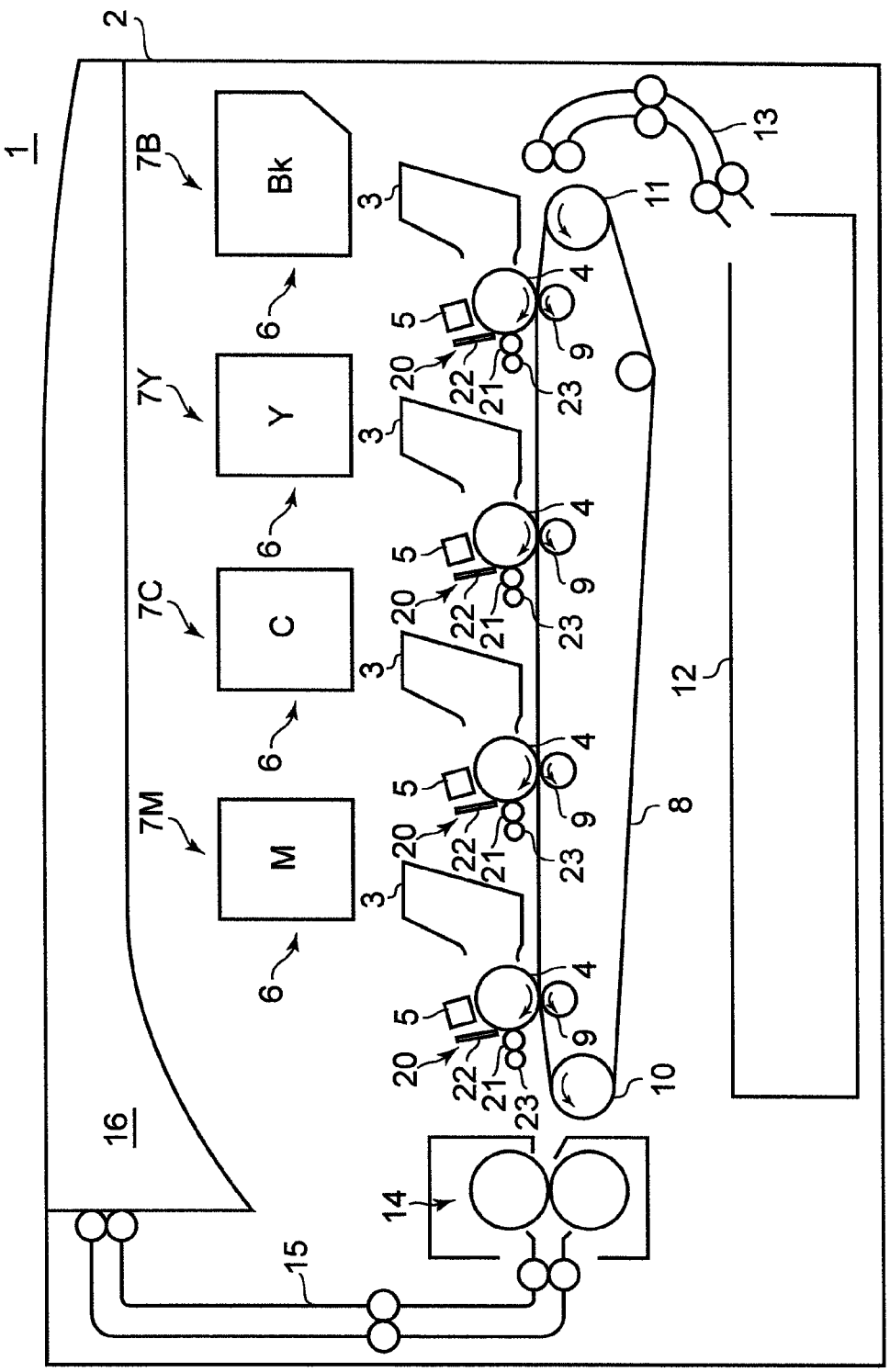
FIG. 1 is an overall sectional view showing an example of the configuration of a tandem color printer as an example of an image forming apparatus according to the present disclosure.

Hereinafter, a tandem color printer 1 as an example of an image forming apparatus according to the present disclosure is described based on the drawings. FIG. 1 is a sectional view schematically showing the overall structure of the color printer 1. The color printer 1 includes four image forming units 7M, 7C, 7Y and 7Bk corresponding to toners of respective colors of magenta M, cyan C, yellow Y and black Bk. These image forming units 7M to 7Bk are tandemly arranged above a sheet conveyor belt 8 such that the image forming unit 7M is located at a most downstream side of a sheet conveyance path.

Figure 2:
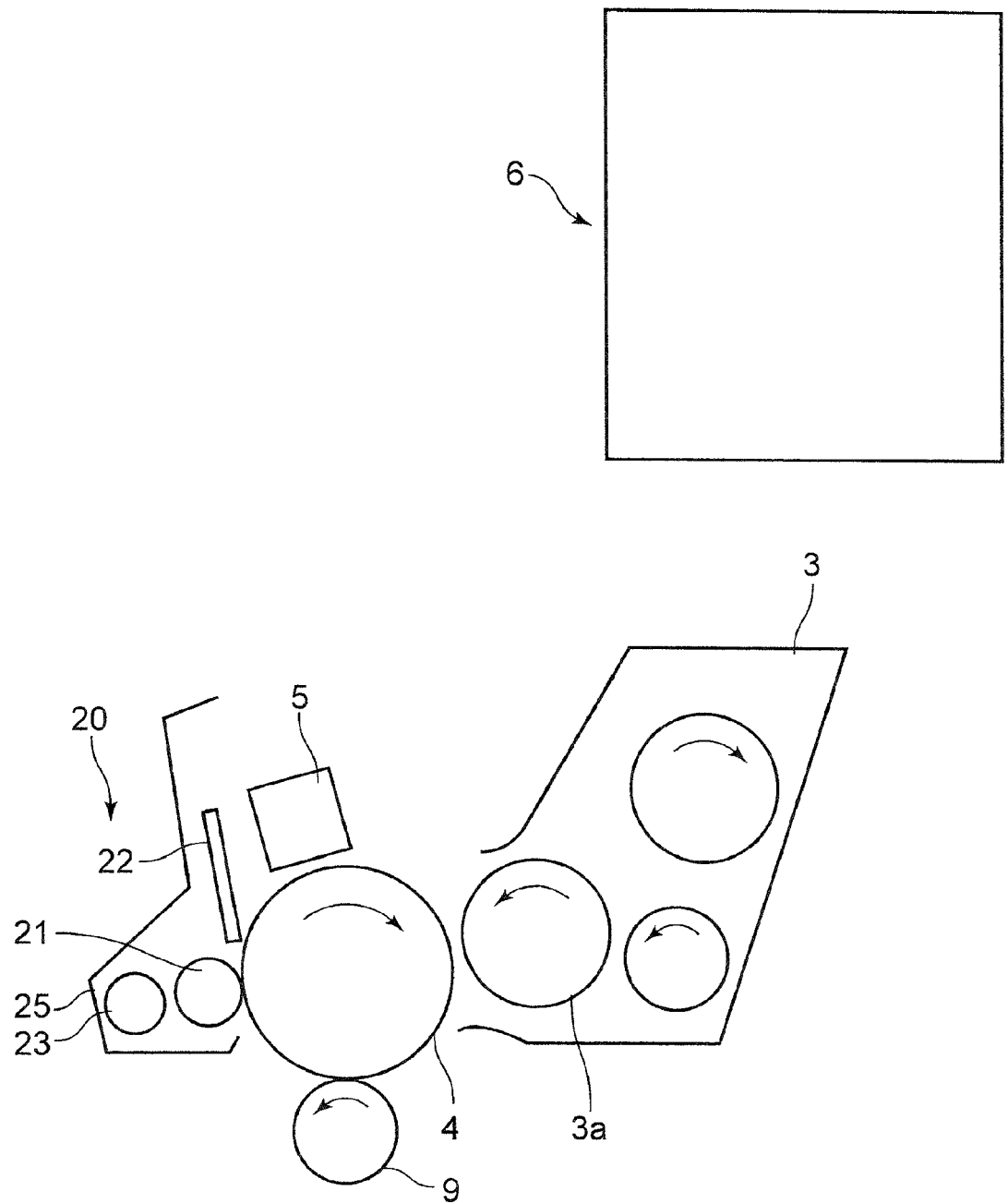
FIG. 2 is an enlarged sectional view of an image forming unit.

As shown in FIG. 2, each of the image forming units 7M, 7C, 7Y and 7Bk includes a photoconductive drum 4 (photoconductive member) having a surface for bearing a toner image, and a charger 5, an optical scanning device 6, a developing device 3 with a development sleeve 3a, a transfer roller 9 and a cleaning mechanism 20 arrange around the photoconductive drum 4.

The photoconductive drum 4 is a cylindrical body which is driven and rotated about its shaft, and bears an electrostatic latent image and a toner image on the circumferential surface thereof. A photoconductive drum made of amorphous silicon (a-Si) material can be, for example, used as the photoconductive drum 4. The charger 5 uniformly charges the surface of the photoconductive drum 4. The optical scanning device 6 irradiates the uniformly charged surface of the photoconductive drum 4 with a beam modulated based on image data, thereby forming an electrostatic latent image. The developing device 3 supplies toner to the surface of the photoconductive drum 4 to develop the electrostatic latent image formed on the photoconductive drum 4. The transfer roller 9 forms a nip portion together with the photoconductive drum 4 while sandwiching a sheet conveyor belt 8 therebetween, and transfers a toner image on the photoconductive drum 4 to a recording sheet. The cleaning mechanism 20 cleans the surface of the photoconductive drum 4 after the transfer of the toner image.

The sheet conveyor belt 8 is an endless belt and is sandwiched between the respective photoconductive drums 4 and the respective transfer rollers 9 of the respective image forming units 7M, 7C, 7Y and 7Bk. A recording sheet fed from a sheet feeding mechanism 12 and supplied via a sheet conveyance path 13 is conveyed on this sheet conveyor belt 8. Toner images are successively transferred in a superimposition manner onto this recording sheet by the respective image forming units 7Bk, 7Y, 7C and 7M. Thereafter, formation of a full color image on the recording sheet is completed by a toner image fixing process by a fixing unit 14. This recording sheet is discharged to a discharge unit 16 via a sheet conveyance path 15. Although an example in which the respective toner images are directly transferred to the recording sheet conveyed on the sheet conveyor belt 8 is shown in this embodiment, respective toner images may be primarily transferred to an intermediate transfer belt and, thereafter, a full color toner image may be secondarily transferred to a recording sheet.

The cleaning mechanism 20 removes residual toners and the like on the photoconductive drum 4. The cleaning mechanism 20 includes a cleaning roller 21 and a cleaning blade 22 for cleaning the surface of the photoconductive drum 4, a cleaning spiral 23 for discharging the toner removed from the surface of the photoconductive drum 4 to the outside of the image forming unit 7M, 7C, 7Y or 7Bk, and a casing 25.

The cleaning roller 21 is made of an elastic material such as urethane foam and arranged at a position facing the photoconductive drum 4. The cleaning roller 21 is arranged to slide in contact with the surface of the photoconductive drum 4 at a side downstream of a toner image transfer position (position facing the transfer roller 9) by the photoconductive drum 4 and rotates in a forward direction toward the same side as the photoconductive drum 4 is rotated (direction of an arrow of FIG. 2).

The cleaning blade 22 is a plate-like member made of urethane rubber or the like and arranged such that one end thereof slides in contact with the photoconductive drum 4 at a side further downstream of the cleaning roller 21. The cleaning blade 22 scrapes off the toner remaining on the surface of the photoconductive drum 4 after cleaning by the cleaning roller 21.

The spiral 23 is such that a spiral blade is formed around a rotary shaft. The spiral 23 rotates the cleaning toner (waste toner) removed from the surface of the photoconductive drum 4 in a direction to discharge it through a toner discharge opening provided in a front plate of the cleaning mechanism 20.

Figure 3:
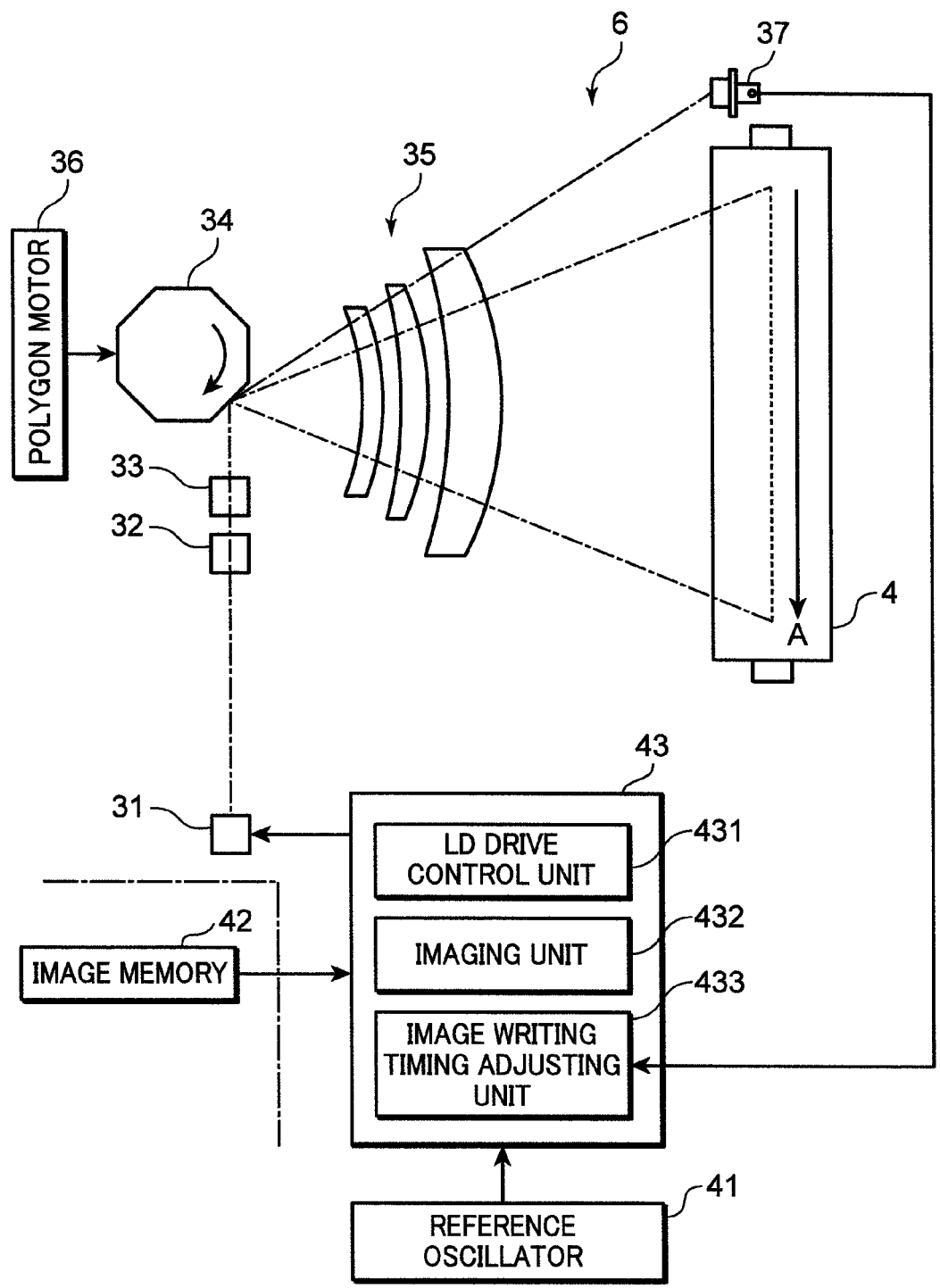
FIG. 3 is a block diagram showing an example of the configuration of an optical scanning device.

Next, the optical scanning device 6 included in each image forming unit 7M, 7C, 7Y or 7Bk is described in detail. FIG. 3 is block diagram showing a schematic configuration of the optical scanning device 6 and a control system thereof. The optical scanning device 6 includes a laser irradiator 31 (light source) for emitting a laser beam, a collimator lens 32, a prism 33, a polygon mirror 34 (rotating polygon mirror), an f-θ lens 35, a polygon motor 36 (part of a driver) and a beam detect sensor 37 (optical sensor; hereinafter, referred to as a BD (beam detect) sensor).

The laser irradiator 31 includes a laser light source such as a laser diode (LD). A laser beam emitted from the laser light source is converted into a parallel beam by the collimator lens 32, the prism 33 and the like. This parallel beam is reflected toward the polygon mirror 34 by an unillustrated reflecting mirror and incident on the polygon mirror 34.

The polygon mirror 34 has a plurality of reflecting surfaces (has eight surfaces in FIG. 3) for reflecting the laser beam emitted from the laser irradiator 31 toward the photoconductive drum 4. The polygon motor 36 drives and rotates the polygon mirror 34 at a constant speed in an arrow direction of FIG. 3. The laser beam irradiated from the laser irradiator 31 is successively reflected toward the photoconductive drum 4 by different reflecting surfaces as the polygon mirror 34 rotates. The laser beam reflected toward the photoconductive drum 4 by the polygon mirror 34 is imaged as a spot having a predetermined diameter on the surface of the photoconductive drum 4 by the f-θ lens 35. That is, the laser beam is successively reflected by the respective reflecting surfaces of the polygon mirror 34 by the rotation of the polygon mirror 34, whereby the laser beam is scanned in a rotary shaft direction (main scanning direction, direction of an arrow A of FIG. 3). By this scanning, electric charges on the surface of the photoconductive drum 4 are removed to form an electrostatic latent image.

The BD sensor 37 includes a photodiode, is arranged at a predetermined position outside a scanning area, receives the laser beam scanned by the polygon mirror 34 and outputs a light reception signal. The BD sensor 37 is used to adjust a timing at which beam scanning (hereinafter, referred to as an image writing operation) used to form a toner image on the photoconductive drum 4 is performed. When the laser beam reflected by the polygon mirror 34 rotating in the direction of the arrow of FIG. 3 passes through the f-θ lens 35 and is incident on the BD sensor 37, a detection signal is output from the BD sensor 37. The detection signal of this BD sensor 37 is input to an image writing timing adjusting unit 433 to be described later and used to adjust an image writing timing of the laser beam scanned across the surface of the photoconductive drum 4.

Each optical scanning device 6 is electrically connected to a common controller 43. The controller 43 takes an operation timing in accordance with a reference clock signal output from a reference oscillator 41, performs an image writing timing adjustment at this operation timing and controls the drive of the laser irradiator 31 based on an image signal of an image to be written output from an image memory 42.

The controller 43 (computer) includes peripheral devices such as an unillustrated CPU (Central Processing Unit), a RAM (Random Access Memory) and a ROM (Read Only Memory) storing programs specifying the operation of the CPU, and a storage such as a RAM for temporarily storing data, and controls the entire color printer 1 in accordance with instruction information received by an unillustrated operation unit and detection signals from sensors provided at suitable positions of the color printer 1.

Further, the controller 43 functions by operation of the programs as an LD drive control unit 431, an imaging unit 432 and the image writing timing adjusting unit 433.

The imaging unit 432 starts the drive of the LD drive control unit 431 based on an image signal of an image to be written output from the image memory 42. The LD drive control unit 431 controls the drive of the laser emitter 31 based on an instruction from the imaging units 432. The image writing timing adjusting unit 433 adjusts an image writing timing at which the surface of the photoconductive drum 4 is scanned across and outputs it to the imaging units 432 based on a BD signal output from the BD sensor 37.

Figure 4:
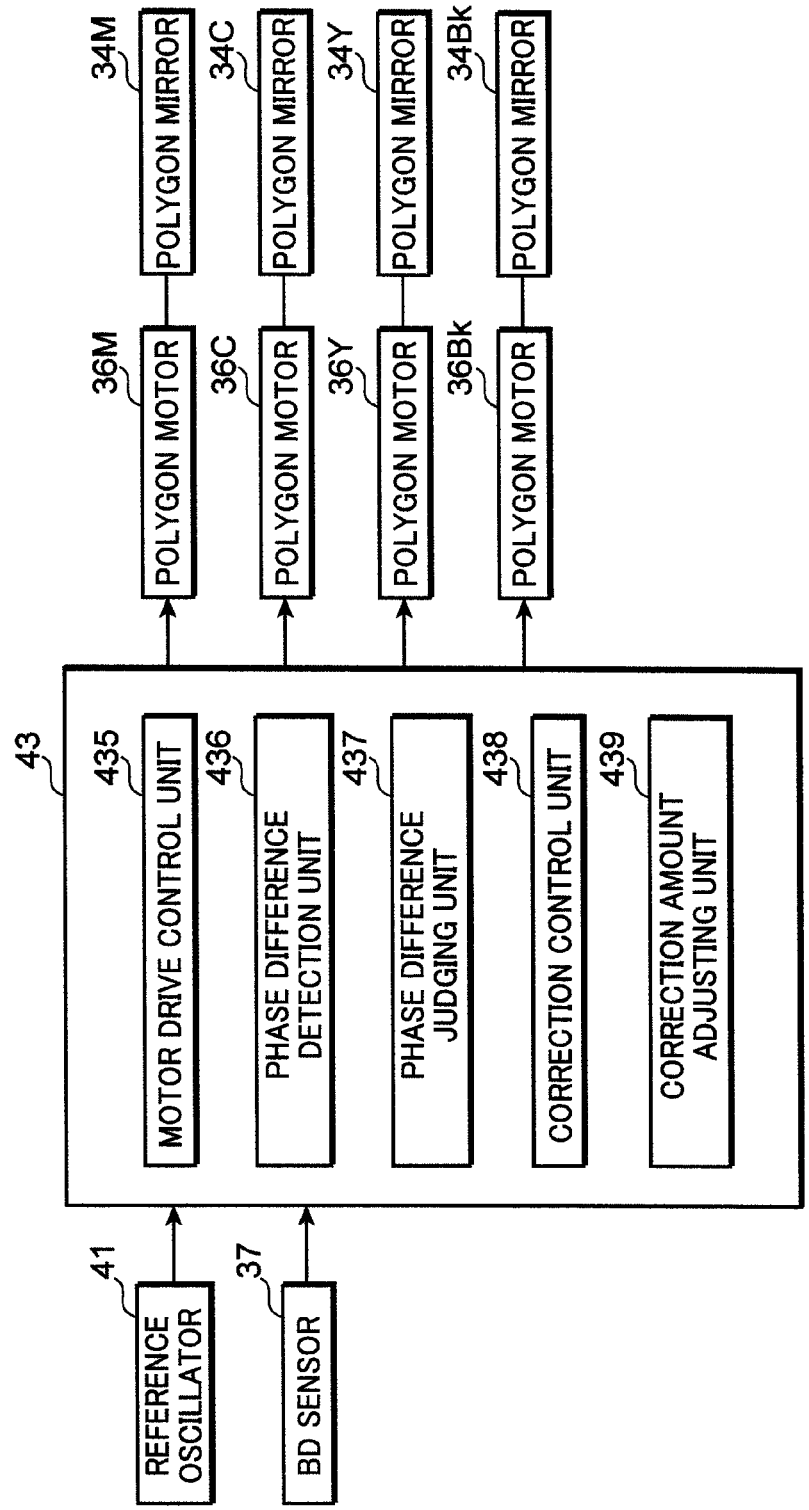
FIG. 4 is a block diagram showing an example of the configuration of a rotation control system for polygon mirrors.

FIG. 4 is a diagram showing an example of the configuration of a rotation control system for the polygon mirrors 34. Note that, in the following description, the polygon mirrors 34 of the optical scanning devices 6 of the respective colors of magenta M, cyan C, yellow Y and black Bk are respectively denoted by "34M", "34C", "34Y" and "34Bk". Further, the polygon motors 36 of the optical scanning devices 6 of the respective colors of magenta M, cyan C, yellow Y and black Bk are respectively denoted by "36M", "36C", "36Y" and "36Bk".

The controller 43 functions as a motor drive control unit 435 (part of the driver), a phase difference detection unit 436, a phase difference judging unit 437, a correction control unit 438 and a correction amount adjusting unit 439 in association with the operation control of the polygon motors 36M, 36C, 36Y and 36Bk.

The motor drive control unit 435 frequency-divides (driving) a reference clock signal output from the reference oscillator 41 (FIG. 3) and generates a drive clock signal of a predetermined drive frequency. Using this drive clock signal, the motor drive control unit 435 drives and rotates the polygon motors 36M, 36C, 36Y and 36Bk at predetermined rotational speeds.

Further, the motor drive control unit 435 changes the rotational speeds of the polygon motors 36M, 36C, 36Y and 36Bk by changing frequencies (drive frequencies) of the drive clock signals under an instruction from the correction control unit 438 to be described later, whereby the rotational speeds of the polygon motors 34M, 34C, 34Y and 34Bk are changed.

The phase difference detection unit 436 detects rotational phase differences of the other polygon mirrors (e.g. polygon mirrors 34C, 34M, 34Y) with respect to a reference rotational phase which is a rotational phase of a specific polygon mirror 34 (e.g. polygon mirror 34Bk) set as a reference based on BD signals output from the BD sensors 37 utilizing a period which is not an image writing period (imaging period).

Figure 5:
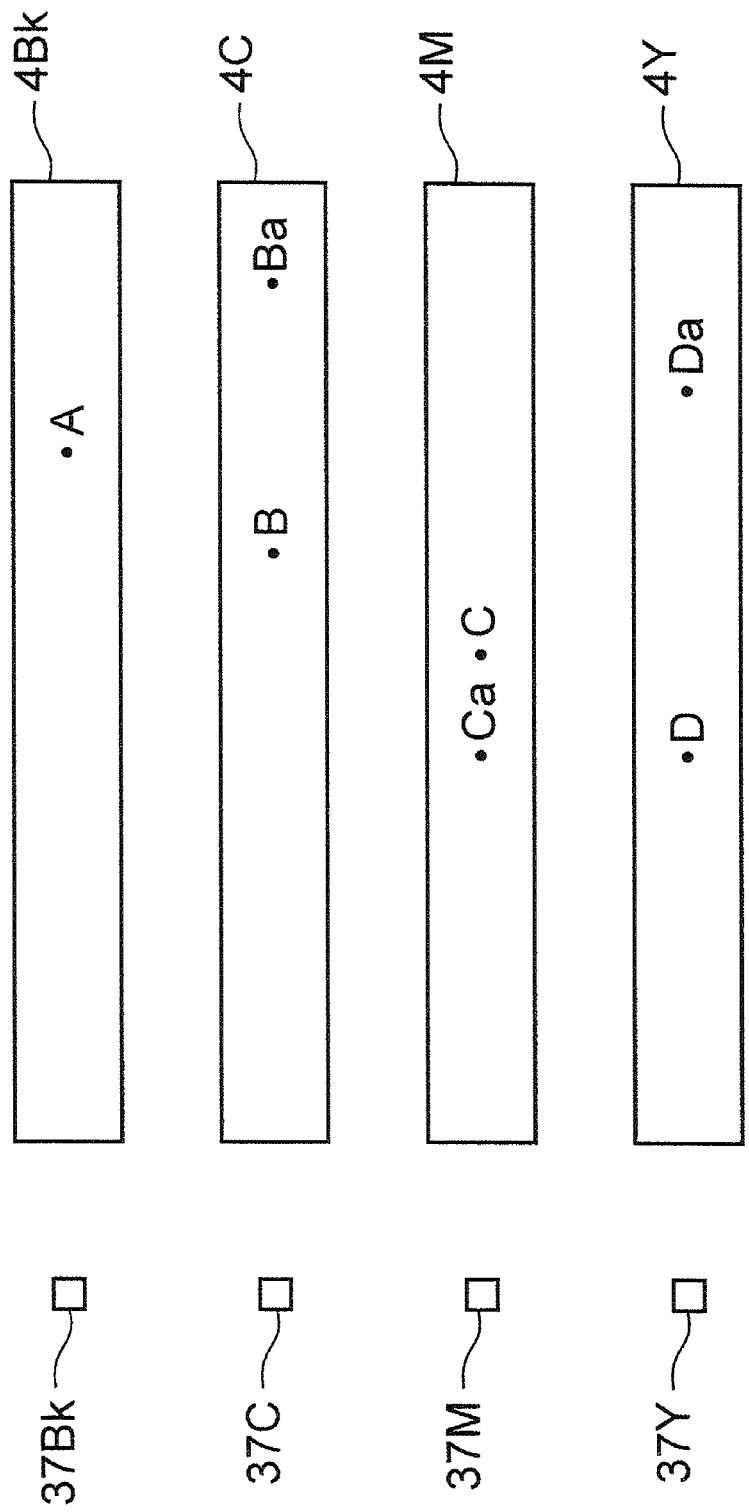
FIG. 5 is a diagram showing an example of a positional relationship of laser beam irradiated positions on surfaces of photoconductive drums in a state where rotational phase differences are proper and a state where they are improper, respectively.

FIG. 5 is a diagram showing an example of a positional relationship of laser beam irradiated positions on the surfaces of the photoconductive drums 4Bk, 4C, 4M and 4Y of the respective colors. For example, it is assumed that irradiated positions on the surfaces of the photoconductive drums 4Bk to 4Y by laser beams output from the respective laser irradiators 31 are positions A, B, C and D shown in FIG. 5 at a certain timing. In this case, output timings of output signals of the BD sensors 37Bk to 37Y by the respective laser beams are respectively shifted by time lags equivalent to position gap amounts of the respective positions A, B, C and D in the main scanning direction. The time lags are equivalent to rotational phase differences of the respective polygon mirrors 34Bk to 34Y. The phase difference detection unit 436 detects rotational phase differences of the other polygon mirrors 34C, 34M and 34Y with respect to the polygon mirror 34Bk as the reference using the output timings of the signals output from the respective BD sensors 37Bk to 37Y.

The phase difference judging unit 437 judges whether or not a phase difference detected by the phase difference detection unit 436 coincides with a predetermined phase difference, i.e. whether or not the phase difference detected by the phase difference detection unit 436 is proper.

The phase difference judging unit 437 compares the predetermined proper rotational phase difference (reference rotational phase difference) and an actually detected rotational phase difference in the above judgment. The reference rotational phase difference is a rotational phase difference of each polygon mirror 34C, 34M, 34Y when the irradiated position of the laser beam on the surface of the photoconductive drum 4 at a certain timing is in a standard positional relationship such as the position A, B, C and D shown in FIG. 5. The phase difference judging unit 437 judges the rotational phase difference to be proper when the rotational phase difference detected by the phase difference detection unit 436 coincides with the above reference rotational phase difference or when a difference between the two rotational phase differences lies in such a range that the two rotational phase differences can be substantially considered to coincide.

On the other hand, the phase difference judging unit 437 judges the rotational phase difference to be improper (judges no coincidence) when the rotational phase difference detected by the phase difference detection unit 436 does not coincide with the above reference rotational phase difference, e.g. when the irradiated positions of the laser beams on the surfaces of the photoconductive drums 4 at a certain timing are in a positional relationship of positions A, Ba, Ca and Da shown in FIG. 5. Note that a factor making the rotational phase difference detected by the phase difference detection unit 436 improper is thought to be, for example, variations of voltages supplied to the polygon motors 36C, 36M, 36Y and 36Bk, electrical noise, vibration or the like.

The correction control unit 438 changes the rotational phases of the other polygon mirrors 34C, 34M and 34Y, for example, based on the rotational phase of the polygon mirror 34Bk when the rotational phase difference detected by the phase difference detection unit 436 is judged to be improper by the phase difference judging unit 437. The correction control unit 438 changes drive frequencies of drive clock signals for controlling the drive of the polygon motors 36C, 36M and 36Y and outputs control signals for driving the respective polygon motors 36C, 36M and 36Y by drive clock signals of the changed drive frequencies to the motor drive control unit 435. The drive frequencies are so changed that the rotational phase differences of the other polygon mirrors 34C, 34M and 34Y with respect to the rotational phase of the polygon mirror 34Bk are adjusted to the above reference rotational phase differences.

Specifically, the correction control unit 438 changes the drive frequencies of the polygon motors 36C, 36M and 36Y for driving and rotating the polygon mirrors 34C, 34M and 34Y whose rotational phase differences are judged to be improper by predetermined correction amounts (phase correction amounts). Alternatively, the correction control unit 438 changes the drive frequencies by position correction amounts reduced by specified amounts predetermined by the correction amount adjusting unit 439 to be described later. The correction control unit 438 performs a phase correction process of driving the polygon motors 36C, 36M and 36Y for periods corresponding to predetermined clock numbers by the drive clock signals of the changed drive frequencies. The phase correction process by the correction control unit 438 is described in detail later.

The correction amount adjusting unit 439 performs the phase correction process again using a secondary correction amount obtained by reducing the predetermined correction amount by a predetermined specified amount when the rotational phase difference detected by the phase difference detection unit 436 does not coincide with the reference rotational phase difference after causing the correction control unit 438 to perform the phase correction process again using the predetermined correction amount.

The flow of a control of correcting the rotational phase difference of the polygon mirror 34 is described. Note that the control of correcting the rotational phase difference of the polygon mirror 34C (second rotating polygon mirror) with respect to the reference rotational phase that is the rotational phase of the polygon mirror 34Bk (first rotating polygon mirror) is described as a specific example.

FIG. 7 is a timing chart showing examples of BD signals, drive clock signals and corrected signals of these. In FIG. 7, reference signs (a) to (g) attached at the left ends of charts respectively denote the following signals.

(a) BD signal of the polygon mirror 34Bk
(b) reference BD signal of the polygon mirror 34C
(c) reference drive clock signal of the polygon motor 36C
(d) BD signal when the polygon mirror 34C has an improper rotational phase difference
(e) drive clock signal of the polygon motor 36 at the time of the above (d)
(f) corrected BD signal of the polygon mirror 34C
(g) corrected drive clock signal of the polygon motor 36C Here, as shown in the above (a) to (c), it is premised that the irradiated positions of the laser beams on the surfaces of the photoconductive drums 4 are in a positional relationship of the positions A, B shown in FIG. 5 when a BD signal output from the BD sensor 37 having received a laser beam reflected by the polygon mirror 34C is output at timing delayed by a time lag T from a BD signal output from the BD sensor 37Bk having received a laser beam reflected by the polygon mirror 34Bk. That is, this time lag T is described to be a reference rotational phase difference T corresponding to the polygon mirror 34C when the rotational phase of the polygon mirror 34Bk is a reference rotational phase.

Further, there is described an example in which the drive frequency f of the polygon motor 36C for driving the polygon mirror 34C when the rotational phase difference of the polygon mirror 34C is the reference rotational phase difference T is 100 Hz and one cycle t (=1/f) of the drive clock signal of this drive frequency f is 10 ms (=1000 ms/100 Hz).

Figure 6:
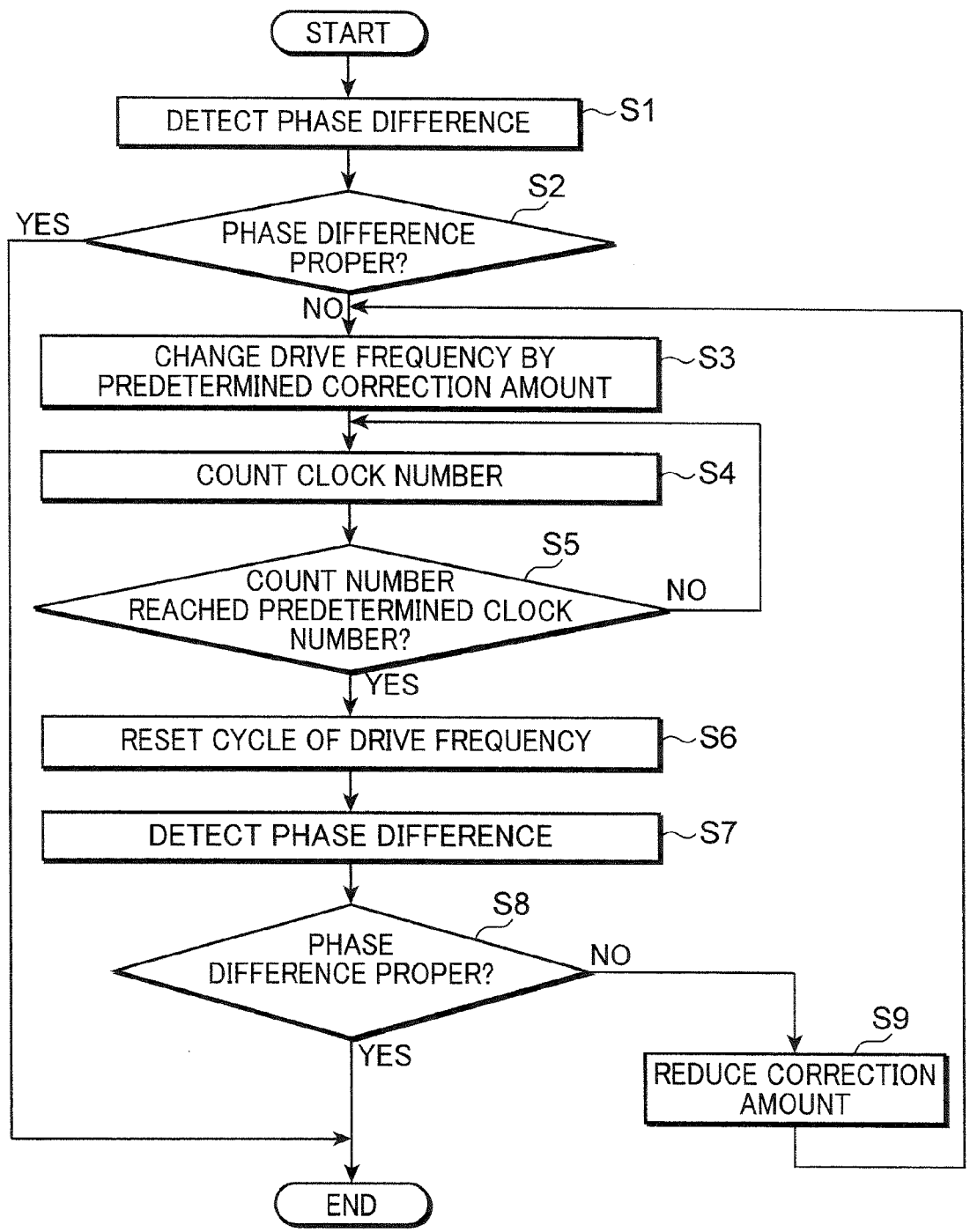
FIG. 6 is a flow chart showing an example of a control of correcting the rotational phase difference of the polygon mirror.

FIG. 6 is a flow chart showing an example of a control of correcting the rotational phase difference of the polygon mirror. For example, when the control of correcting the rotational phase difference of the polygon mirror 34C is started by the controller 43 at a predetermined timing such as every time image writing is finished, the phase difference detection unit 436 detects the rotational phase difference (Step S1). That is, the phase different detection unit 436 detects the rotational phase difference of the polygon mirror 34C with respect to the rotational phase of the polygon mirror 34Bk using the BD signals respectively output from the BD sensors 37Bk, 37C having received the laser beams reflected by the polygon mirrors 34Bk and 34C (information on rotating states).

Specifically, the phase difference detection unit 436 detects a rotational phase difference Td of the rotational phase of the polygon mirror 34C with respect to the rotational phase of the polygon mirror 34Bk as shown in (d) of FIG. 7 in Step S1. In FIG. 7, the BD signal output from the BD sensor 37C having received the laser beam reflected by the polygon mirror 34C is output at a timing delayed by the time lag (T+ΔT) from the BD signal output from the BD sensor 37Bk having received the laser beam reflected by the polygon mirror 34Bk. This indicates that the rotational phase difference Td of the polygon mirror 34C is a period of ΔT larger than the reference rotational phase difference T.

Subsequently, the phase difference judging unit 437 judges whether or not the rotational phase difference Td detected by the phase difference detection unit 436 coincides with the predetermined reference rotational phase difference T, thereby judging whether or not the phase difference detected by the phase difference detection unit 436 is proper (Step S2). In this specific example, the phase difference judging unit 437 judges that the rotational phase difference Td is improper (No in Step S2) since the rotational phase difference Td (=T+ΔT) detected by the phase difference detection unit 436 does not coincide with the reference rotational phase difference T.

Note that the controller 43 finishes the control of correcting the rotational phase difference of the polygon mirror 34 when the rotational phase difference is judged to coincide with the predetermined reference rotational phase difference, i.e. the rotational phase difference detected by the phase difference detection unit 436 is judged to be proper by the phase difference judging unit 437 in Step S2 (YES in Step S2).

When the rotational phase difference Td is judged not to coincide with the reference rotational phase difference, i.e. the rotational phase difference detected by the phase difference detection unit 436 is judged to be improper by the phase difference judging unit 437 in Step S2 (NO in Step S2), the correction control unit 438 changes the drive frequency of the polygon motor 36C for driving and rotating the polygon mirror 34C by the predetermined phase correction amount (Step S3).

For example, the predetermined phase correction amount P is assumed to indicate a percentage of the amount of reducing a period t of one cycle with the period t of one cycle of the reference drive clock signal of the polygon mirror 36C as 100%.

In this case, as shown in (f) and (g) of FIG. 7, the correction control unit 438 reduces one cycle t of the drive clock signal of the polygon motor 36C by the phase correction amount P in Step S3. That is, the correction control unit 438 outputs a control signal indicating an instruction to drive the polygon motor 36C by a drive clock signal (corrected drive clock signal) of a frequency f/(1−P), one cycle of which is (1−P)×t, to the motor drive control unit 435. Note that × indicates multiplication and/indicates division.

Subsequently, the correction control unit 438 counts a clock number of the corrected drive clock signal changed by the predetermined phase correction amount in Step S3 (Step S4). Until the counted clock number reaches a predetermined clock number (NO in Step S5), Step S4 is performed and it is continued to count the clock number of the corrected drive clock signal. When the counted clock number reaches the predetermined clock number (YES in Step S5), the correction control unit 438 resets the drive frequency to the drive frequency before the change in Step S3 and outputs a control signal indicating an instruction to drive the polygon motor 36C for driving and rotating the polygon mirror 34C to the motor drive control unit 435 (Step S6).

In short, a process of the above Steps S3 to S6 is a process for shifting the rotational phase of the polygon mirror 34C by the predetermined amount (here, phase correction amount P) by temporarily changing the drive frequency of the polygon mirror 34C to a frequency higher than a reference.

For example, as shown in (g) of FIG. 7, the polygon motor 36C is driven by one clock by the corrected drive clock signal, one cycle of which is (1−P)×t, when the counted clock number is 1 in Step S4. In this way, the rotational phase of the polygon mirror 34C is shifted in a direction to shorten the phase difference ΔT corresponding to a delayed time and the rotational phase difference with respect to the polygon mirror 34Bk is shortened by (P×t).

Here, the rotational phase difference needs to be shortened by the phase difference ΔT between the rotational phase difference Td (=T+ΔT) and the reference rotational phase difference T. To this end, the polygon motor 36C may be driven by a corrected drive clock signal, one cycle to of which is (1−P)×t, for a period corresponding to the clock number expressed by ΔT/(P×t) which is a result of dividing the phase difference ΔT by the phase difference (P×t) that can be shortened by one clock of the corrected drive clock signal.

Accordingly, the correction control unit 438 calculates the predetermined clock number in Step S5 by the following equation:

$$\text{Clock number} = \Delta T/(t-tA) = \Delta T/(P \times t)$$

Note that although one cycle is changed to tA=(1−P)×t only for one clock in (g) of FIG. 7, the correction control unit 438 changes one cycle to tA=(1−P)×t for the clock number calculated in the above equation.

Then, when the clock number counted in Step S4 reaches the calculated predetermined clock number, the correction control unit 438 judges that the rotational phase difference was shortened by (P×t)×ΔT/(P×t), i.e. the rotational phase difference was shortened by ΔT. Then, the correction control unit 438 resets the drive frequency to the drive frequency f before the change in Step S3 and outputs a control signal indicating an instruction to drive the polygon motor 36C for driving and rotating the polygon mirror 34C to the motor drive control unit 435 in Step S6.

Referring back to FIG. 6, when Step S6 is performed by the correction control unit 438, the drive frequency is reset to the drive frequency before the change in Step S3 and the control signal indicating the instruction to drive the polygon motor 36C is output to the motor drive control unit 435 by the correction control unit 438, the correction amount adjusting unit 439 causes the phase difference detection unit 436 to detect a rotational phase difference between the polygon mirrors 34Bk and 34C as in Step S1 (Step S7).

Then, the correction amount adjusting unit 439 causes the phase difference judging unit 437 to judge whether or not the rotational phase difference between the polygon mirrors 34Bk and 34C detected by the phase difference detection unit 436 in Step S7 coincides with the predetermined reference rotational phase difference T. In this way, the phase difference detected by the phase difference detection unit 436 is judged to be proper or not (Step S8).

When the rotational phase difference is judged not to coincide with the predetermined reference rotational phase difference T, i.e. the rotational phase difference is judged to be improper by the phase difference judging unit 437 in Step S8 (NO in Step S8), the correction amount adjusting unit 439 reduces the phase correction amount P and causes the correction control unit 438 to perform the above phase correction process again. In this case, the correction amount adjusting unit 439 reduces the predetermined phase correction amount P, which is the amount by which the drive frequency of the polygon motor 36C is changed by the correction control unit 438 in Step S3, by a predetermined specified amount and sets the result of reduction to a new predetermined phase correction amount P (Step S9). Using this new phase correction amount P, the correction control unit 438 performs Step S3 again.

For example, it is assumed that the predetermined phase correction amount P (first correction amount) in Step S3 is determined to be 10% as an initial value and the rotational phase difference is judged not to coincide with the predetermined reference rotational phase difference T by the phase difference judging unit 437 as a result of judgment in Step S8 made after Step S3 is performed first after the start of this correction control (NO in Step S8). In this case, the correction amount adjusting unit 439 reduces the predetermined phase correction amount P (10%), for example, by one-fourth amount (2.5%) of the phase correction amount P as the predetermined specified amount, and the correction control unit 438 is caused to perform Step S3 again using this reduced phase correction amount (7.5%) as a new predetermined phase correction amount P (second correction amount) (Step S9).

On the other hand, if the rotational phase difference is judged to coincide with the predetermined reference rotational phase difference T, i.e. the rotational phase difference is judged to be proper by the phase difference judging unit 437 in Step S8 (YES in Step S8), the controller 43 finishes the control of correcting the rotational phase difference of the polygon mirror 34.

In this embodiment, the polygon motor 36C is first driven for a period corresponding to a specified clock number by the drive clock signal of the drive frequency (first corrected drive frequency) changed by the predetermined correction amount (first correction amount) by the process (phase correction process) shown in Steps S3 to S5 (first phase correction process). Thereafter, if the rotational phase difference is judged not to coincide with the reference rotational phase difference T in Step S8, a similar phase correction process (second phase correction process) is performed using a drive frequency (second corrected drive frequency) corrected by the correction amount (second correction amount) obtained by subtracting the predetermined specified amount from the first correction amount.

That is, while the drive frequency is gradually reduced, the phase correction process is repeatedly performed until the rotational phase difference comes to coincide with the reference rotational phase difference T. Thus, a possibility of failing an adjustment to bring the rotational phase difference into coincidence with the reference rotational phase difference T can be reduced.

Further, as described above, if the predetermined clock number in Step S5 is calculated as $\Delta T/(P \times t)$, which is a result obtained by dividing the phase difference $\Delta T$ between the rotational phase difference Td $(=T+\Delta T)$ and the reference rotational phase difference T by the phase difference $(P \times t)$ that can be shortened by one clock of the corrected drive clock signal, the rotational phase difference can be theoretically brought into coincidence with the reference rotational phase difference T by performing the process (phase correction process) of Steps S3 to S5 once.

Although the predetermined clock number in Step S5 may be determined by another method, the number of times by which the above phase correction process is repeated can be reduced more when the predetermined clock number in Step S5 is determined by the above method than when the predetermined clock number is determined by the other method. Thus, a time required for the adjustment to bring the rotational phase difference into coincidence with the reference rotational phase difference T can be reduced.

The control of correcting the rotational phase difference of the polygon mirror 34C with respect to the reference rotational phase that is the rotational phase of the polygon mirror 34Bk is described in the above embodiment. Controls of correcting the rotational phase differences of the polygon mirrors 34M, 34Y based on the rotational phase of the polygon mirror 34Bk are performed in a manner similar to this.

Further, the rotational phase of any one of the polygon mirrors 34C, 34M and 34Y different from the polygon mirror 34Bk may be set as a reference and correction controls may be performed for the rotational phase differences between the reference polygon mirror 34 and the other polygon mirrors 34 different from the reference polygon mirror 34 in a manner similar to the above.

As described above, according to the present disclosure, a possibility of failing an adjustment to bring the rotational phase difference of the rotating polygon mirror into coincidence with the reference rotational phase difference can be reduced.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming apparatus, comprising:
    a plurality of image forming units for forming a toner image, each image forming unit including:
        a photoconductive member having a surface for bearing a toner image;
        a light source for emitting a laser beam,
        a rotating polygon mirror having a plurality of reflecting surfaces for reflecting the laser beam toward the photoconductive member and configured to scan the laser beam across the surface of the photoconductive member in a main scanning direction using the rotating reflecting surfaces by rotating;
        a driver for driving and rotating the rotating polygon mirror using a drive clock signal of a predetermined drive frequency; and
        an optical sensor for receiving the laser beam scanned by the rotating polygon mirror at a predetermined position and outputting a signal;
    a phase difference detection unit for detecting a rotational phase difference of another rotating polygon mirror with respect to a rotational phase of the rotating polygon mirror set as a reference out of the rotating polygon mirrors provided in the respective image forming units using signals output by the optical sensors;
    a correction control unit for performing a phase correction process of changing a drive frequency of the driver for driving and rotating the rotating polygon mirror having a rotational phase difference judged not to coincide by a predetermined correction amount and driving the driver for a period corresponding to a specified clock number by a drive clock signal of the changed drive frequency if the rotational phase difference detected by the phase difference detection unit does not coincide with a reference rotational phase difference; and a correction amount adjusting unit for reducing the predetermined correction amount by a predetermined specified amount and causing the correction control unit to perform the phase correction process again if the rotational phase difference detected by the phase difference detection unit after the phase correction process is performed by the correction control unit does not coincide with the reference rotational phase difference; wherein the predetermined specified amount is an amount to reduce the predetermined correction amount by at least three-fourths, and the correction amount adjusting unit causes the correction control unit to perform the phase correction process again by using the reduced correction amount.

2. An image forming apparatus according to claim 1, wherein:

the correction control unit calculates the predetermined clock number by the following equation:

clock number=$\Delta T/(t-tA)$, when $\Delta T$ denotes a phase difference between the rotational phase difference and the reference rotational phase difference, t denotes a period of one cycle by the predetermined drive frequency, and tA denotes a period of one cycle by a drive frequency obtained after changing the predetermined drive frequency by the predetermined correction amount.

3. An image forming apparatus, comprising:

a plurality of image forming units for forming a toner image, each image forming unit including:

a photoconductive member having a surface for bearing a toner image;

a light source for emitting a laser beam, a rotating polygon mirror having a plurality of reflecting surfaces for reflecting the laser beam toward the photoconductive member and adapted to scan the laser beam across the surface of the photoconductive member in a main scanning direction using the rotating reflecting surfaces by rotating;

a driver for driving and rotating the rotating polygon mirror using a drive clock signal of a predetermined drive frequency; and an optical sensor for receiving the laser beam scanned by the rotating polygon mirror at a predetermined position and outputting a signal;

a phase difference detection unit for detecting a rotational phase difference of another rotating polygon mirror with respect to a rotational phase of the rotating polygon mirror set as a reference out of the rotating polygon mirrors provided in the respective image forming units using signals output by the optical sensors;

a correction control unit for performing a phase correction process of changing a drive frequency of the driver for driving and rotating the rotating polygon mirror having a rotational phase difference judged not to coincide by a predetermined correction amount and driving the driver for a period corresponding to a specified clock number by a drive clock signal of the changed drive frequency if the rotational phase difference detected by the phase difference detection unit does not coincide with a reference rotational phase difference; and a correction amount adjusting unit for reducing the predetermined correction amount by a predetermined specified amount and causing the correction control unit to perform the phase correction process again if the rotational phase difference detected by the phase difference detection unit after the phase correction process is performed by the correction control unit does not coincide with the reference rotational phase difference, wherein the predetermined specified amount is a one-fourth amount of the predetermined correction amount; and the correction amount adjusting unit reduces the predetermined correction amount by the one-fourth amount and causes the correction control unit to perform the phase correction process again.

4. A method for adjusting a rotational phase difference of a second rotating polygon mirror with respect to a first rotating polygon mirror by a computer, the method causing the computer to perform the following series of processes:

a process of driving and rotating the first rotating polygon mirror and the second rotating polygon mirror using a drive clock signal of a predetermined drive frequency and calculating a rotational phase difference of both the first and second rotating polygon mirrors using information on a rotating state of the first rotating polygon mirror and that of the second rotating polygon mirror;

a process of comparing the rotational phase difference and a predetermined reference rotational phase difference and judging whether or not the rotational phase difference is proper;

a first phase correction process of temporarily changing a drive frequency of the second rotating polygon mirror from a reference drive frequency to a first corrected drive frequency corrected by a first correction amount and driving the second rotating polygon mirror when the rotational phase difference is judged not to be proper, and then resetting the drive frequency from the first corrected drive frequency to the reference drive frequency;

a process of calculating the rotational phase difference of both the first and second rotating polygon mirrors again using information on the rotating state of the first rotating polygon mirror and that of the second rotating polygon mirror after the first phase correction process;

a process of comparing the rotational phase difference calculated again and the reference rotational phase difference and judging whether or not the rotational phase difference is proper; and a second phase correction process of setting a second corrected drive frequency obtained by correcting the drive frequency by a second correction amount that is a reduced amount by at least three-fourths of the first correction amount, temporarily changing the drive frequency of the second rotating polygon mirror from the reference drive frequency to the second corrected drive frequency and driving the second rotating polygon mirror, and then resetting the drive frequency from the second corrected drive frequency to the reference drive frequency if the rotational phase difference is judged not to be proper.

5. A method according to claim 4, wherein:

the second correction amount is a correction amount to be reduced by one-fourth of the first correction amount.

* * * * *